(12) United States Patent
Xin et al.

(10) Patent No.: US 6,181,674 B1
(45) Date of Patent: Jan. 30, 2001

(54) METHOD AND APPARATUS FOR SHARING TRANSMIT SHAPING FILTERS AMONG PHASE SHIFTED SIGNALS

(75) Inventors: Weizhuang Xin, Aliso Viejo; Ganning Yang, Irvine; Kenneth S. Walley, Portola Hills, all of CA (US)

(73) Assignee: Conexant Systems, Inc., Newport Beach, CA (US)

( * ) Notice: Under 35 U.S.C. 154(b), the term of this patent shall be extended for 0 days.

(21) Appl. No.: 09/164,428

(22) Filed: Sep. 30, 1998

(51) Int. Cl.[7] .................................................. H04J 11/00
(52) U.S. Cl. ............................................. 370/203; 370/206
(58) Field of Search ..................................... 370/203, 206, 370/342; 375/261, 367

(56) References Cited

U.S. PATENT DOCUMENTS

| | | | |
|---|---|---|---|
| 5,600,675 | * 2/1997 | Engeler | 375/261 |
| 5,691,974 | * 11/1997 | Zehavi et al. | 370/203 |
| 5,748,687 | * 5/1998 | Ozluturk | 375/367 |

* cited by examiner

Primary Examiner—Salvatore Cangialosi
(74) Attorney, Agent, or Firm—Akin, Gump, Strauss, Hauer & Feld, L.L.P.; Shane X. Short

(57) ABSTRACT

A unique system for efficiently implementing filtered, phase shifted channels is disclosed. Instead of using separate transmit shaping filters for each channel, and modulating the filtered signals with phase-shifted carrier and one might suppose, the system phase rotates the signals for each channel and modulates such phase rotated signals with a single carrier. In addition, the system decomposes the phase rotations into 90° pre-filter portions and a post-filter portion of, for example, 45°. In an 8 channel system, such as proposed in the IS-95B standard, the channels are divided into two groups and the 90° phase rotations for each group are done at the input of the transmit shaping filters. A 45° phase rotation is then done for one of the groups at the output of the transmit shaping filter. Significantly, no multiplication is required.

11 Claims, 8 Drawing Sheets

| Channel i | Carrier Phase Offset Φ (radian) |
|---|---|
| 0 | 0 |
| 1 | $\pi/2$ |
| 2 | $\pi/4$ |
| 3 | $3\pi/4$ |
| 4 | 0 |
| 5 | $\pi/2$ |
| 6 | $\pi/4$ |
| 7 | $3\pi/4$ |

METHOD AND APPARATUS FOR SHARING TRANSMIT SHAPING FILTERS AMONG PHASE SHIFTED SIGNALS

BACKGROUND OF THE INVENTION

1. Field of the Invention

The present invention relates generally to wireless communication systems, and more particularly, to a method and apparatus for efficiently phase-shifting a plurality of signals and for sharing transmit shaping filters among the plurality of phase-shifted signals.

2. Description of Related Art

Transmit shaping filters are commonly used in communication systems in order to modify the baseband signal so that it is better suited for transmission over the intended channel. FIG. 1 is a symbolic block diagram of a transmit signal processing portion 10 for a wireless CDMA communication system now being developed in the IS-95B Standard. As shown, the IS-95B Standard presently contemplates the transmission of up to "n+1" digital baseband signals $A_0$–$A_n$ by directly sequencing the digital baseband signals $A_0$–$A_n$ with I and Q spreading codes to form in-phase $I_n$ and quadrature $Q_n$ signals; delaying the quadrature signals $Q_n$ by ½ a PN chip relative to the in-phase signals $I_n$; shaping the in-phase $I_n$ and quadrature $Q_n$ signals via "n+1" pairs of "baseband filters" 20 I, 20Q to produce filtered signals $I_n'$, $Q_n'$; modulating the filtered signals $I_n'$, $Q_n'$ with variously phase-shifted I and Q carriers $$\cos(2\pi f_c t) \text{ and } \sin(2\pi f_c t)$$
$$\cos(2\pi f_c t + \phi_1) \text{ and } \sin(2\pi f_c t + \phi_1)$$
$$\vdots \qquad \vdots$$
$$\cos(2\pi f_c t + \phi_n), \text{ and } \sin(2\pi f_c t + \phi_n)$$

to produce modulated components; combining the modulated components to form composite signals $s_0(t)$ to $s_n(t)$, and combining the composite signals $s_0(t)$ to $s_n(t)$ into a single transmit signal $s(t)$.

The IS-95B Standard presently contemplates eight code channels (i.e. n=7), one fundamental channel transmitted without any phase offset and seven supplemental channels transmitted with the specific phase offsets shown in FIG. 2. Only four phase offsets, 0, π/4, πn/2, and 3π/4 are needed for eight channels because each phase offset in the 0-to-π range has a 180° counterpart in the π-to-2π range. In other words, when transmitting information with in-phase and quadrature signals I, Q, transmitting I & Q with a phase offset of x is mathematically identical to transmitting –I & –Q with a phase offset of x±180°.

If separate shaping filters are implemented for each channel as suggested by FIG. 1, then the hardware is subject to a great deal of complexity and increased power consumption. Separate transmit shaping filters are normally required, however, if the filtering hardware may not be fast enough to support multi-channel filtering operation.

The different phase offsets of the different channels also add design complexity, either in the analog domain or digital domain. As it is known, the input of the shaping filter for each channel in IS-95B is either 1 or –1. The design of separate filters is relatively simple, therefore, since no multiplication is involved. Implementing phase rotation before the filter or grouping multiple signals together, however, produces multiple signal levels at the filter input. Consequently, multiplication may be required, and the complexity of the filter design may significantly increase.

There remains a need, therefore, for a method and apparatus in a wireless communication system for simply and efficiently phase shifting, shaping, and modulating a plurality of inphase and quadrature signals derived from a plurality of digital baseband signals.

SUMMARY OF THE INVENTION

In a first aspect, the invention may be regarded as a wireless communication system for transmitting eight digital baseband streams over eight code-channels in a wireless channel, the code-channels having predetermined phase offsets when modulated with a carrier, the code-channels being grouped into first and second groups of code-channels wherein the individual code-channels in each group have a phase offset of 0° or 90° and wherein the first and second groups as a whole have a phase offset of $\Delta_{GROUP}°$, the system comprising: means for converting each digital baseband stream into inphase and quadrature signals I, Q,; means for grouping a first plurality of the code channels into a first orthogonal group of code channels comprising zero-degree channels which require a total phase rotation of 0° and ninety-degree channels which require a total phase rotation of 90°; means for grouping a second plurality of the code channels into a second orthogonal groups of code channels comprising zero-plus-delta degree channels which require a total phase rotation of 0°+$\Delta_{GROUP}°$ and ninety-plus-delta degree channels which require a total phase rotation of 90°+$\Delta_{GROUP}°$; first and second pre-filter means for phase-rotating the inphase and quadrature signals I, Q of the ninety-degree channels by 90° to form phase rotated signals $I_{90}$, $Q_{90}$ by setting $I_{90}$=Q and $Q_{90}$=–I; first and second pre-filter means for combining the signals I, Q of the zero-degree channels with the signals $I_{90}$, $Q_{90}$ of the ninety-degree channels to form combined signals $I_A$, $Q_A$ and $I_B$, $Q_B$, respectively; first means for filtering the combined signals $I_A$, $Q_A$ to form filtered signals $I_A'$, $Q_A'$ that are better suited for transmission over the wireless channel; second means for filtering the combined signals $I_B$, $Q_B$ to form filtered signals $I_B'$, $Q_B'$ that are better suited for transmission over the wireless channel, said second filtering means further comprising means for scaling the filtered signals $I_B'$, $Q_B'$ with phase-rotation coefficients $K_I$, $K_Q$ to produce scaled and filtered signals $K_I I_B'$, $K_Q Q_B'$; post-filter means for phase-rotating the scaled and filtered signals $K_I I_B'$, $K_Q Q_B'$ by mathematically processing such signals to produce filtered and phase-rotated signals $I_B''$, $Q_B''$; and means for combining the phase-rotated and filtered signals $I_A'$, $Q_A'$ and the phase-rotated and filtered phase-rotated signals $I_B''$, $Q_B''$ to form final signals $I_{FINAL}$, $Q_{FINAL}$.

BRIEF DESCRIPTION OF THE DRAWINGS

The just summarized invention can be best understood with reference to the following figures of which.

DETAILED DESCRIPTION OF THE PREFERRED EMBODIMENTS

Figure 1:
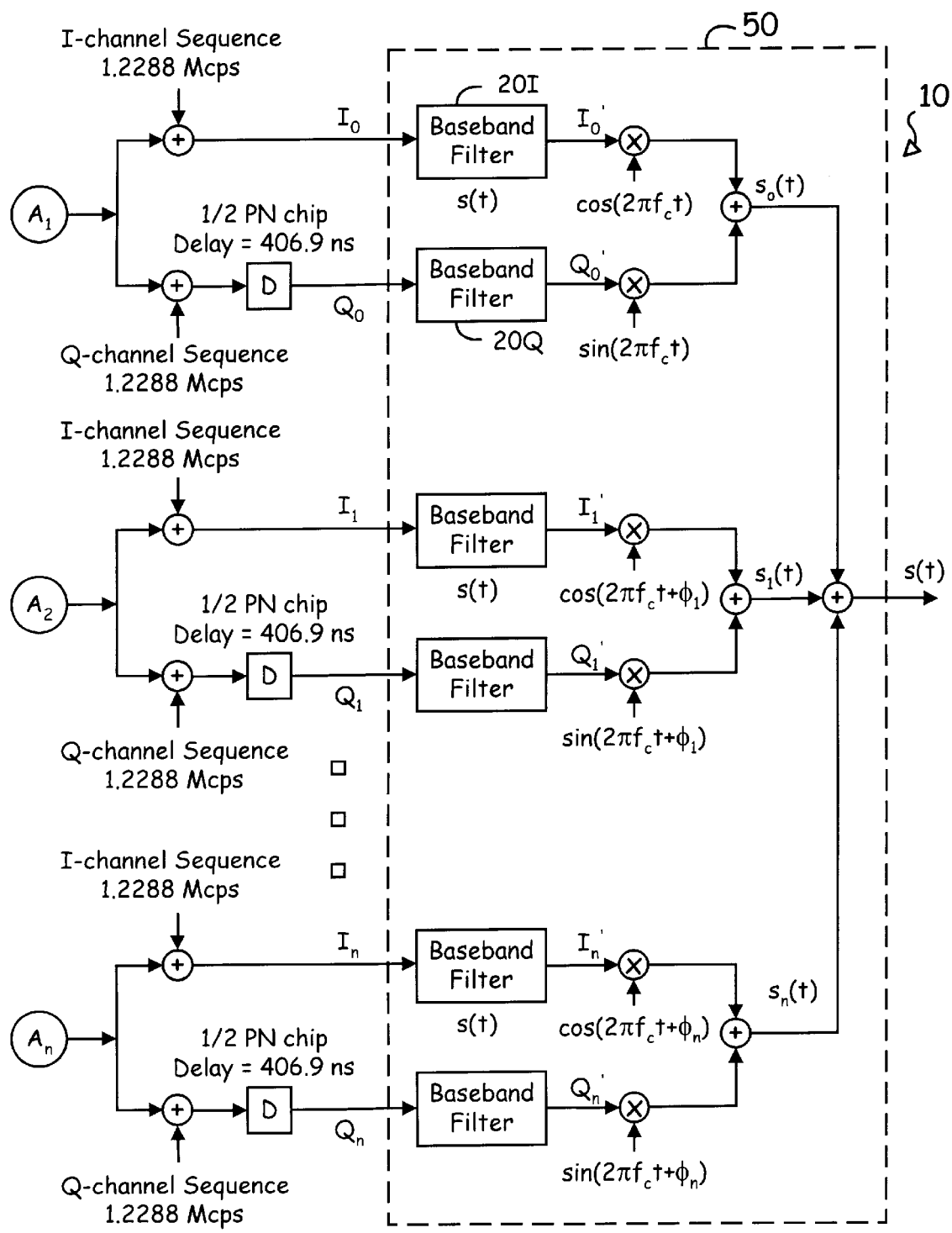
FIG. 1 is a prior art block diagram of a transmit signal processing portion 10 taken from the now progressing IS-95B Standard which shows a plurality of digital baseband signals $A_0$–$A_n$ that are directly sequenced into I and Q signals, shaped by corresponding filters 20I and 20Q, modulated by a plurality of phase shifted carriers to produce signals $s_0(t)$ to $s_n(t)$, and then combined to form an overall transmit signal $s(t)$.
Figures 2, 3:
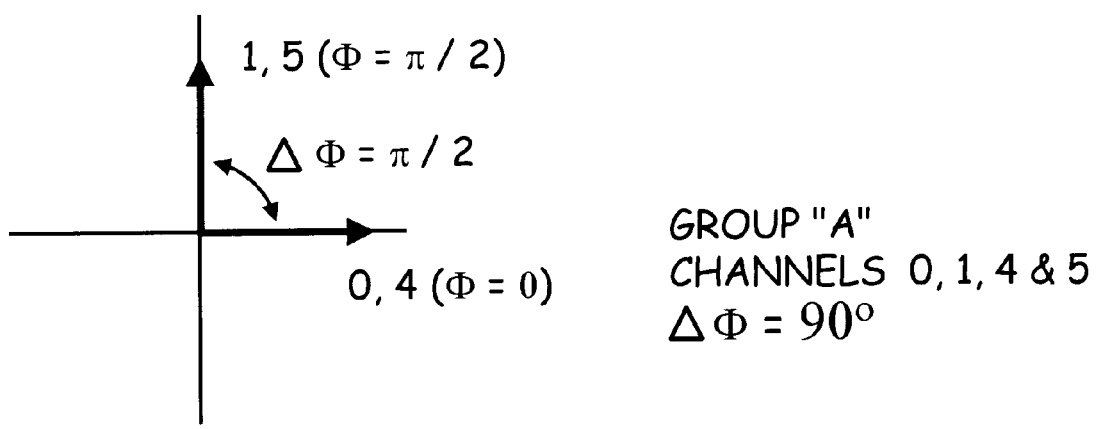
FIG. 2 is a table of the phase offsets used for the fundamental and the seven supplemental channels in the IS-95B Standard.
FIG. 3 shows the 90° phase offsets between channels 0, 1, 4 and 5.

The table of FIG. 2 shows the phase offsets that the IS-95B standard presently requires for its eight CDMA channels 0 to 7. The signals may be phase shifted, as suggested by FIG. 1, by mixing the corresponding in-phase and quadrature signals $I_0$, $Q_0$ to $I_7$, $Q_7$, with phase-shifted carriers. Alternatively, but not shown, the signals could be phase-shifted by separately phase-rotating each corresponding pair of in-phase and quadrature signals $I_0$, $Q_0$ to $I_7$, $Q_7$ before filtering and then mixing the filtered and rotated signals with an un-shifted carrier. This latter approach, however, requires two $\pi/4$ rotators, two $\pi/2$ rotators, two $3\pi/4$ rotators, and eight transmit shaping filters. The hardware required for either approach would be extremely complex and costly in terms of size and power consumption.

This invention offers an efficient, cost effective alternative to separately modulating the signals with phase-shifted carriers or to separately rotating and separately filtering the signals. The invention will be described relative to the IS-95B system of FIG. 1. It should be emphasized, however, that the innovative principles of the present invention could be implemented in a system other than one operating according to the IS-95B standard.

High-Level Description

Figure 6:
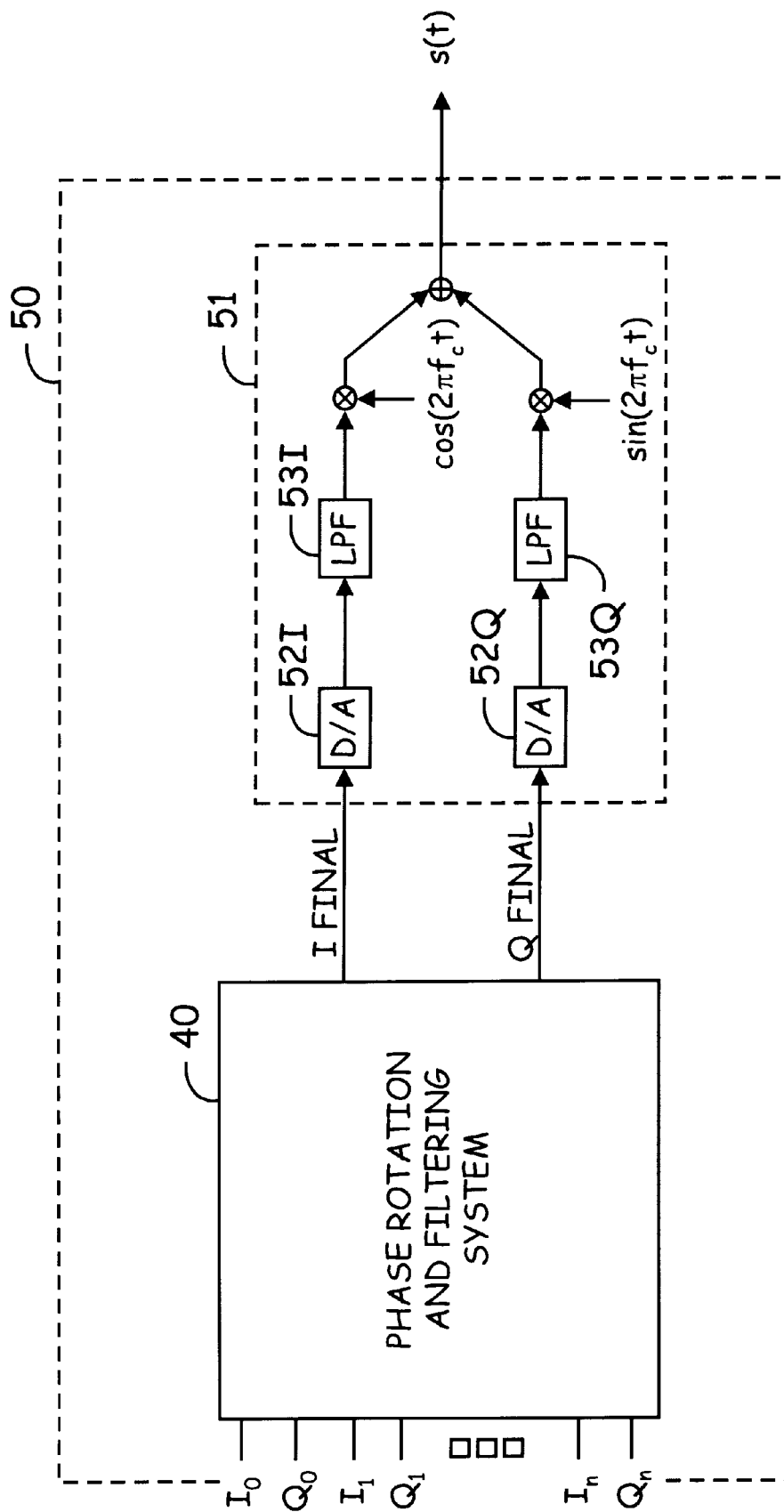
FIG. 6 is a simplified block diagram of a subsystem 50 that is a "black box" equivalent of the like numbered area 50 in FIG. 1 and which contains a first embodiment of a phase rotation and filtering system 40 according to this invention.

FIG. 6 is a schematic block diagram of a subsystem 50 that is externally a "black box" equivalent to the like-numbered subsystem of FIG. 1, but which internally comprises a phase rotation and filtering system 40 according to this invention. As shown, the phase rotation and filtering system 40 receives "raw" signals $I_0$, $Q_0$, to $I_n$, $Q_n$ from a plurality of CDMA channels 0 to N=n+1 as in FIG. 1, but then rotates & filters them (as described below), and combines them into one pair of final signals $I_{FINAL}$, $Q_{FINAL}$. The final signals are then simply provided to a modulating system 51 which outputs an overall transmit signal s(t) (as in FIG. 1).

The modulating system 51 is beneficially simple. Inside the modulating system 51, the final signals $I_{FINAL}$, $Q_{FINAL}$ are first converted to analog with DACs 52I, 52Q. The signals are then passed through corresponding low pass filters 53I, 53Q to remove noise. The filtered analog signals are then modulated with un-shifted sine and cosine components $\sin(2\pi f_c t)$, $\cos(2\pi f_c t)$ which vary in amplitude at the desired carrier frequency $f_c$. Finally, the modulated signals are summed together to produce the overall transmit signal s(t).

Significantly, the modulating system 51 in FIG. 6 only needs the sine and cosine components of a single un-shifted carrier rather than the sine and cosine components of a plurality of phase shifted carriers as in FIG. 1. This is possible because the raw signals $I_0$, $Q_0$, to $I_n$, $Q_n$ are phase rotated, in advance of modulation, in the phase rotation and filtering system 40 of this invention. The operation and simple, highly-efficient structure of the phase rotation and filtering system 40 will be made clear with respect to the more specific embodiments described below.

Mid-level Description

Figure 6A:
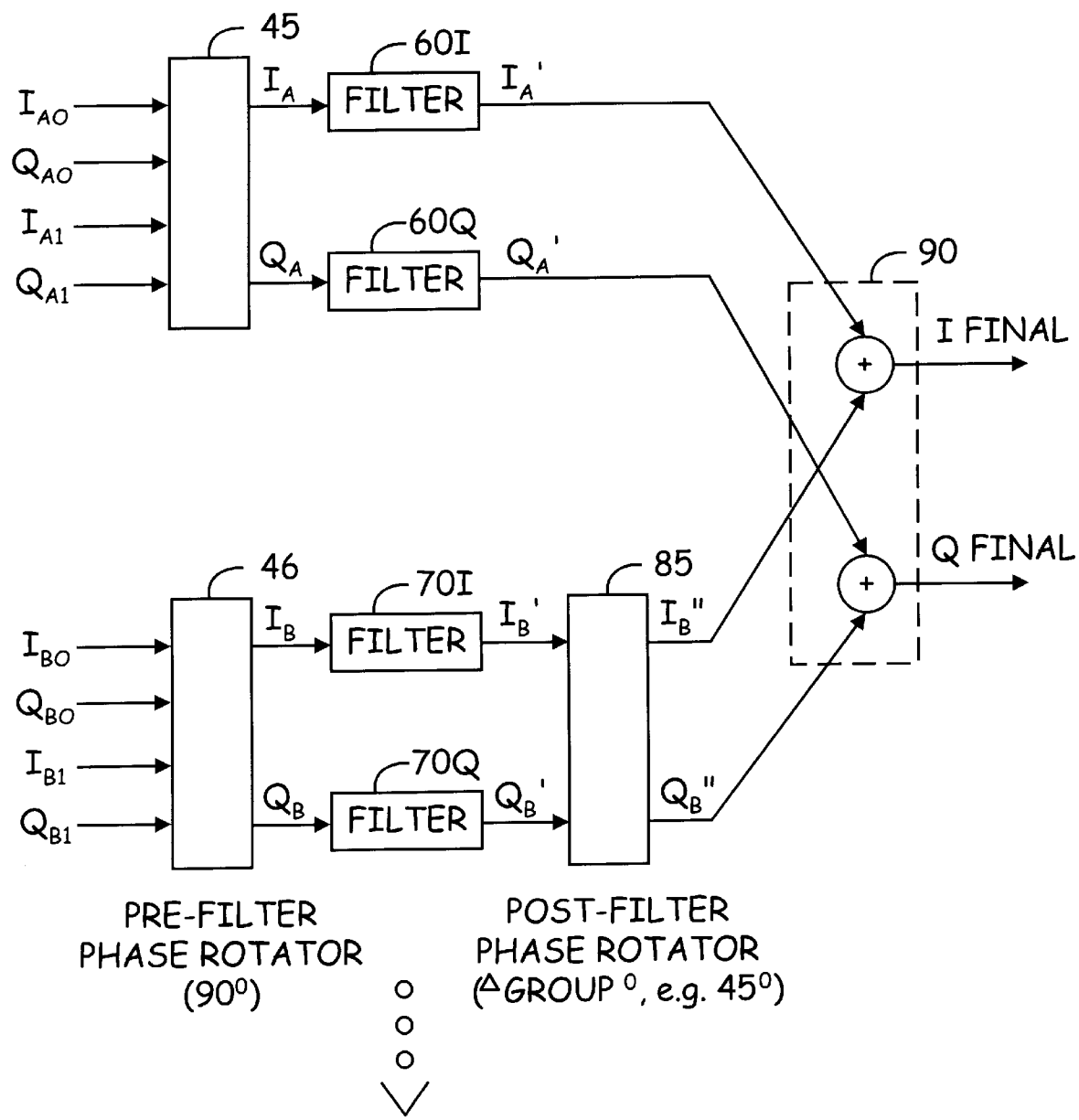
FIG. 6A is a generalized schematic block diagram of the methodology used in the first preferred phase rotation and filtering system 40 of FIG. 6.

FIG. 6A is a simplified block diagram of an innovative phase rotation and filtering system 40 for specific use with eight or more CDMA channels. The system 40 contains at least two "pre-filter" phase rotators 45, 46, at least two pairs of transmit shaping filters 60I, 60Q, 70I, 70Q, at least one "post-filter" phase rotator 85, and a means 90 for combining the rotated and filtered input signals into the final signals $I_{FINAL}$, $Q_{FINAL}$.

The "phase rotation and filtering" system 40 earns its name because it rotates and filters the in-phase and quadrature signals I,Q of digital baseband signals to produce the final signals $I_{FINAL}$, $Q_{FINAL}$ that are ready for modulation with a single carrier and transmission over a communication channel.

The system 40 decomposes the total required phase rotation for each signal into (1) pre-filter rotation and (2) post-filter rotation. In accordance with this invention, the pre-filter rotators 45, 46 always rotate the signals by either 0° or a multiple of 90° because these increments may be easily and efficiently implemented without multipliers by simply summing inverted and non-inverted signals I,Q as described below.

The system 40 essentially takes a "divide and conquer" approach to phase rotation. This approach beneficially allows the signals to be divided into two or more "orthogonal" groups (e.g. groups "A" and "B") having signals with phase offsets of 0° or 90° relative to one another. The signals in each such group can beneficially share a pre-filter rotator (e.g. rotator 45) and a pair of transmit shaping filters (e.g. filters 60I, 60Q).

The post-filter rotator 85 essentially accounts for a phase offset $\Delta_{GROUP}°$ between the orthogonal groups because it further rotates some of the signals by either 0° or $\Delta_{GROUP}°$. The IS-95B offsets of FIG. 2 (0, $\pi/4$, $\pi/2$, and $3\pi/4$), for example, may be provided by dividing the signals into two groups (e.g. "A" and "B") and by designing a post-filter rotator 85 wherein $\Delta_{GROUP}°=45°$, but other quantities of groups and other values of $\Delta_{GROUP}°$ are possible. For example, the system 40 may be scaled to operate on twelve signals that are divided into three orthogonal groups of signals by providing three pre-filter rotators and two post-filter rotators having $\Delta_{GROUP}°=30°$ and $\Delta_{GROUP}°=60°$, respectively.

Regardless of how it is scaled, the system beneficially reduces the number of transmit shaping filters required to effectively transmit a plurality of baseband signals that are normally separately filtered and separately modulated with phase shifted carriers as shown in FIG. 1.

Low-Level Description of the First Embodiment

Figure 7:
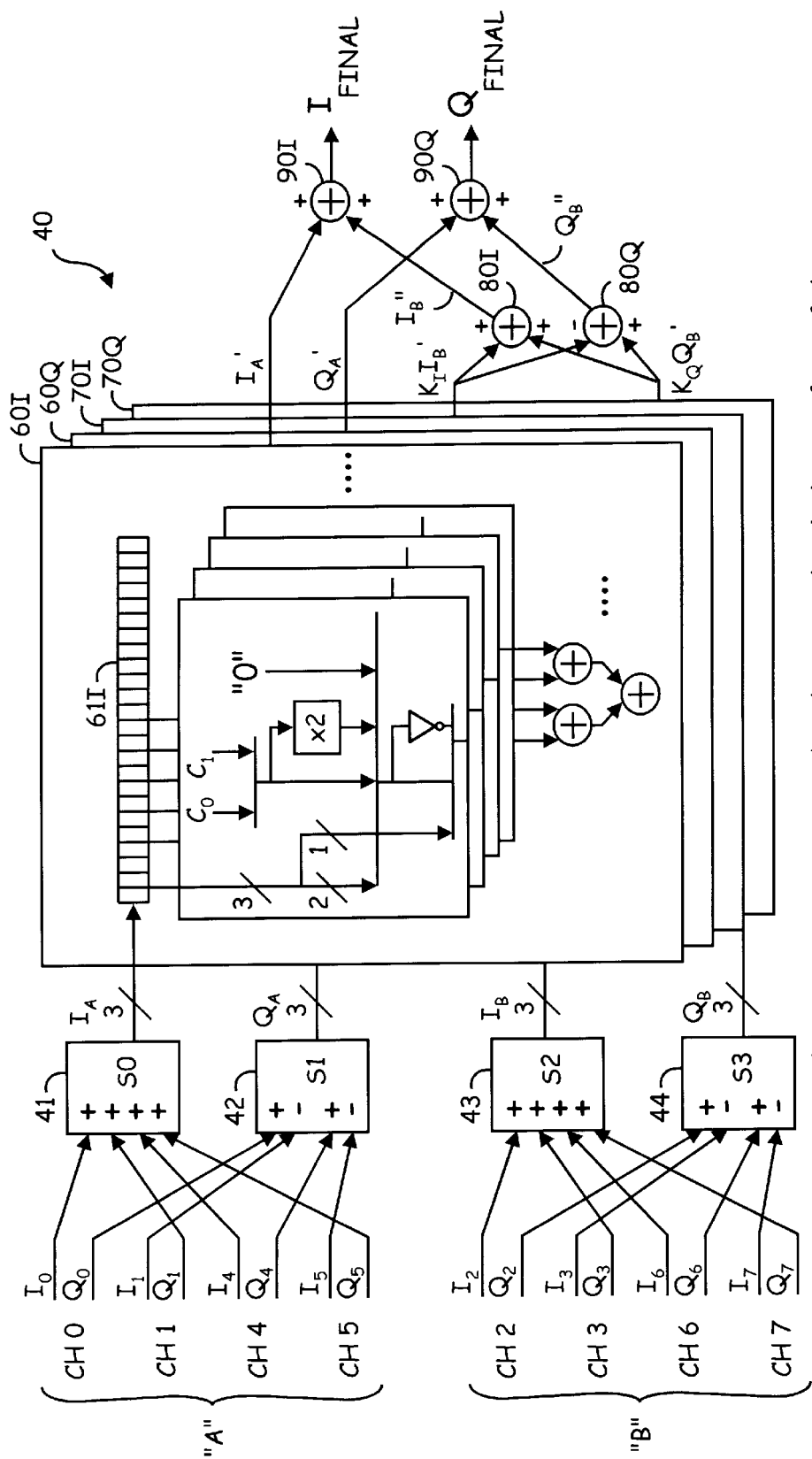
FIG. 7 is a detailed schematic block diagram of the first preferred multiplexed phase rotation and filtering system 40 for use with the eight channels of FIGS. 2–5.

FIG. 7 shows a phase rotation and filtering system 40 for specific use with the IS-95B Standard's eight CDMA channels and phase offsets set forth in FIG. 2.

As suggested in FIG. 7, the eight code channels are divided into two orthogonal groups, an "A" group comprising channels 0, 1, 4 and 5 and a "B" group comprising channels 2, 3, 6 and 7. The rationale for dividing the eight channels into two "A" and "B" groups can be best understood with reference to FIG. 7 taken in view of FIGS. 3, 4 and 5. FIG. 3 shows that the phase offset between the channels 0, 1, 4 and 5 in the "A" group is either 0° or 90°. For example, in FIG. 3, channels 0 and 4 are aligned ($\phi$=0) whereas channels 1 and 5 are offset by 90° ($\phi=\pi/2$). As will be explained further below, the in-phase and quadrature signals I, Q to be transmitted on channels 1 and 5 can be phase rotated by 90°, without multiplication, by simply processing the signals such that I=Q and Q=−I.

Figure 4:
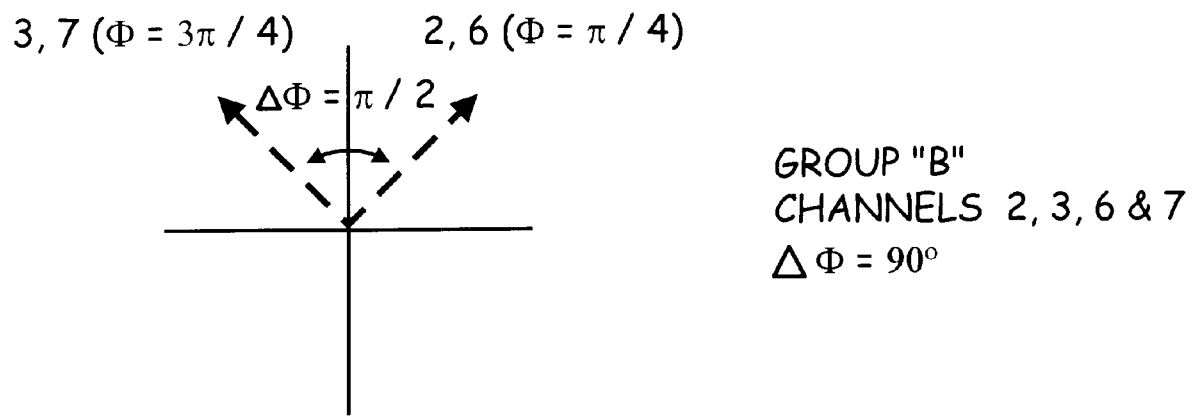
FIG. 4 shows the 90° phase offsets between Channels 2, 3, 6 and 7.

FIG. 4 similarly shows the phase relationship between the channels 2, 3, 6 and 7 in the "B" group. The phase offset here is also either 0° or 90°. As is possible with the channels 1 and 5 in group "A," therefore, the channels 3 and 7 can be phase rotated by 90° by simply processing the in-phase and quadrature signals I, Q such that I=Q and Q=−I.

Figure 5:
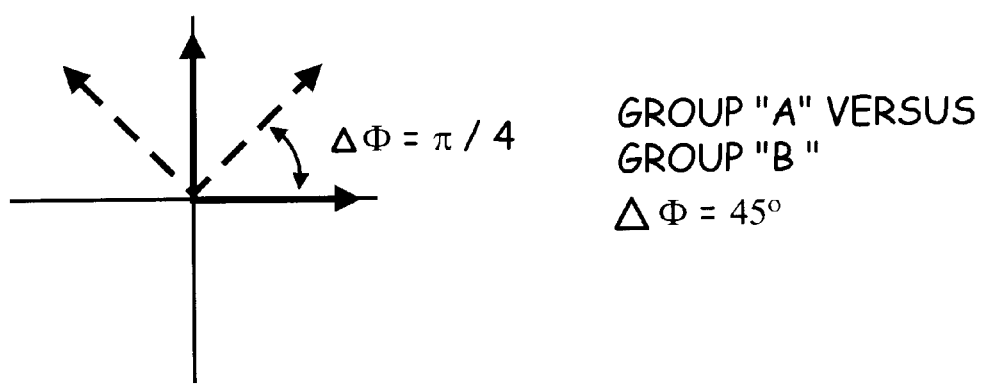
FIG. 5 shows the 45° phase offsets between the channel group of FIG. 3 and the channel group of FIG. 4.

FIG. 5 emphasizes, however, that there is a 45° phase relationship between the channels in group "B" relative to the channels in group "A." As explained further below, these inventors realized that they could implement the necessary 45° phase shift by designing the "B" group's transmit shaping filters to scale the filtered signals $I_B'$, $Q_B'$ with a "rotation coefficient", $$\frac{\sqrt{2}}{2},$$

and by then selectively adding and subtracting the scaled and filtered signals $$\frac{\sqrt{2}}{2}I_B', \frac{\sqrt{2}}{2}Q_B'.$$

FIG. 7 shows the preferred structure for implementing the phase rotation discussed. The in-phase and quadrature signals $I_0$, $Q_0$ to $I_7$, $Q_7$ to be transmitted over the eight channels 0 to 7 are first received in the phase rotation and filtering system 40 by a plurality of 4–3 decoders 41 to 44. The decoders 41 to 44 combine and selectively phase rotate the component signals on the individual channels 0 to 7 using combinatorial logic to produce intermediate signals $I_A$, $Q_A$ and $I_B$, $Q_B$. The intermediate signals $I_A$, $Q_A$ and $I_B$, $Q_B$, kept separate to this point to allow for further, post-filter phase rotation of the signals in at least one of the groups, are then shifted into two pairs of FIR pulse shaping filters 60I, 60Q and 70I, 70Q that are operating with predetermined coefficients $a_0$–$a_{47}$ to produce phase-rotated and filtered signals $I_A'$, $Q_A'$, and $I_B'$, $Q_B'$. The phase-rotated and filtered signals $I_B'$, $Q_B'$ from the "B" group are combined by summing junctions 80I, 80Q to implement a further 45° phase rotation function to produce signals $I''_B$, $Q''_B$ which are directly summed with the signals $I_A'$, $Q_A'$ from the "A" group at summing junctions 90I, 90Q to produce the final signals $I_{FINAL}$, $Q_{FINAL}$.

In summary, the phase rotation and filtering system 40 of FIG. 7 uniquely requires only combinatorial logic (no multiplication!) and only two pairs of FIR pulse shaping filters 60, 70 (as opposed two eight pairs!) by "pre-rotating" some of the "A" channels (channels 0, 1, 4 and 5) and some of the "B" channels (channels 2, 3, 6 and 7). The pre-rotation is accomplished by selective swapping and inverting I and Q components in view of the 90° phase offset between the channels in each group. Furthermore, the system 40 implements the 45° phase relationship that exists between the "A" channels and the "B" channels by "post-rotating" the "B" channels with appropriately selected coefficients in the "B" filters 70I, 70Q.

The operations may be clarified by initially focusing on processing details for the "A" group which includes channels 0, 1, 4 and 5. The decoders 41, 42 of FIG. 7 uniquely map the component signals from the four "A" channels 0, 1, 4 and 5 into a single pair of intermediate signals $I_A$, $Q_A$ that require only one pair of FIR pulse shaping filters $60_I$, $60_Q$ and effectively phase shift each "A" channel according to the IS-95B Standard. As shown, the component signals I, Q of each channel in the "A" group are provided to 4–3 decoders 41, 42 in a predetermined arrangement and in some cases, with a predetermined sign shift, to produce the intermediate signals $I_A$, $Q_A$. In the case of channels 0 and 4 which are to be modulated by the carrier without any phase shift, there is no sign shift of either component signal $I_0$, $Q_0$ or $I_4$, $Q_4$. Accordingly, the component signals $I_0$, $Q_0$ and $I_4$, $Q_4$ are combined into the intermediate signals $I_A$, $Q_A$ without swapping or inverting. In the case of channels 1 and 5, however, a different correspondence occurs. In particular, the component signals $I_1$, $Q_1$ and $I_5$, $Q_5$ are swapped and the $I_1$ and $I_5$ components are inverted when being combined into the intermediate signals $I_A$, $Q_A$.

A similar operation takes place with respect to the "B" channels 2, 3, 6 and 7, the 4–3 decoders 43, 44, and the FIR filters 70I, 70Q. The channels in the "B" group, however, must be phase shifted by an additional 45° pursuant to the IS-95B Standard. The coefficients of the FIR filters 70I, 70Q preferably cause the filtered output signals $$I''_B = \frac{\sqrt{2}}{2} I'_B$$

and $$Q''_B = \frac{\sqrt{2}}{2} Q'_B$$

such that the signals are simply summed together at summing junctions 80I and 80Q, with the appropriate sign, to implement the extra 45° of phase rotation.

Finally, the filtered signals $I'_A$, $Q'_A$ are combined with the filtered signals $B''_B$, $Q''_B$ at summing junctions 90I and 90Q to produce the final signals $I_{FINAL}$ and $Q_{FINAL}$ which, as shown in FIG. 6, are modulated with the sine and cosine components of a single phase carrier $f_c$.

The benefit of the present invention is that only two groups of pulse shaping filters 60, 70 are required rather than the eight which would be necessary if implementing the conventional system of FIG. 1. The savings in hardware complexity and operating power are obvious.

Although the specific implementation of the pulse shaping filters 60, 70 is not an essential element of the method and apparatus of sharing filters through pre-filter and post-filter phase rotation, as just described, the remainder of this disclosure will discuss the inventors preferred filter embodiment. As shown in FIG. 7, each FIR shaping filter 60I, 60Q, 70I, 70Q, receives values from a shift register 61I, 61Q, 71I, 71Q (only the first is visible).

For the single I or Q channel, the filter input is clocked at the chip rate while the filter output is clocked at the chipX4 rate. Thus, the FIR shaping filter with 48 coefficients operates at the chipX4 over-sampling rate after zero insertion to match with the output rate. That means only ¼ of the samples in the filter, i.e., 12, have a non-zero value at any one time. Therefore only ¼ of the coefficients, i.e. 12, contributes to the filter output. The standard multi-rate (1:4) filter design can be easily applied.

In the IS-95B system, however, the standard multi-rate (1:4) design has to be modified to accommodate the fact that quadrature signal Q is delayed by ½ chip as shown by delay blocks "D" in FIG. 1. Due to pre-filter phase rotation, Channel Q and channel I signals are mixed together. Therefore the filter should be designed as follows. The input rate is clocked at the ChipX2 rate. 24 shift registers hold for the filter operation. The 48 coefficients are divided into two subsets. Each subset has 24 coefficients. One of the subsets has even coefficients (0, 2 . . . 46) and the other subset has odd coefficients (1, 3 . . . 47). The subsets are used simultaneously to filter the input samples such that the output rate is still at the chipX4 rate.

Second Pipelined Embodiment

Figure 8:
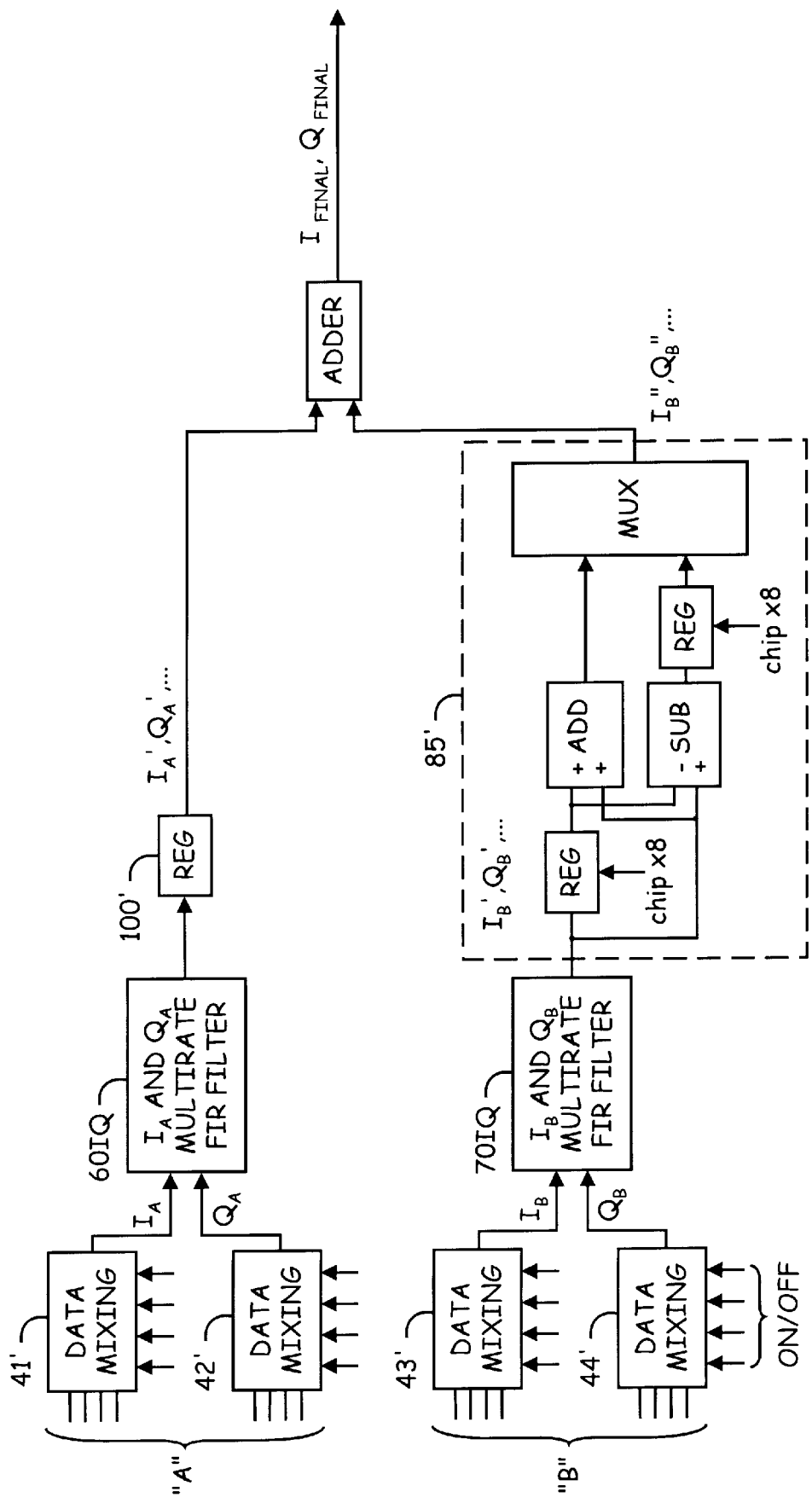
FIG. 8 is a schematic block diagram of a second embodiment of a phase rotation and filtering system 40' which uses a pipelined approach to further reduce hardware requirements.

FIG. 8 shows a "pipelined" embodiment where the I and Q signals in each group ("A" or "B") beneficially share one shaping filter. As shown, the eight channel I and eight channel Q signals are regrouped into four sets that each have four input signals. The four sets are further arranged to form an "A" group and a "B" group, as discussed above, to perform 90 degree pre-filter phase rotation. A pipeline structure is applied here, however, in order to save hardware since the channel Is and channel Qs are shifted by ½ chip but require the same decoding function.

Figure 9:
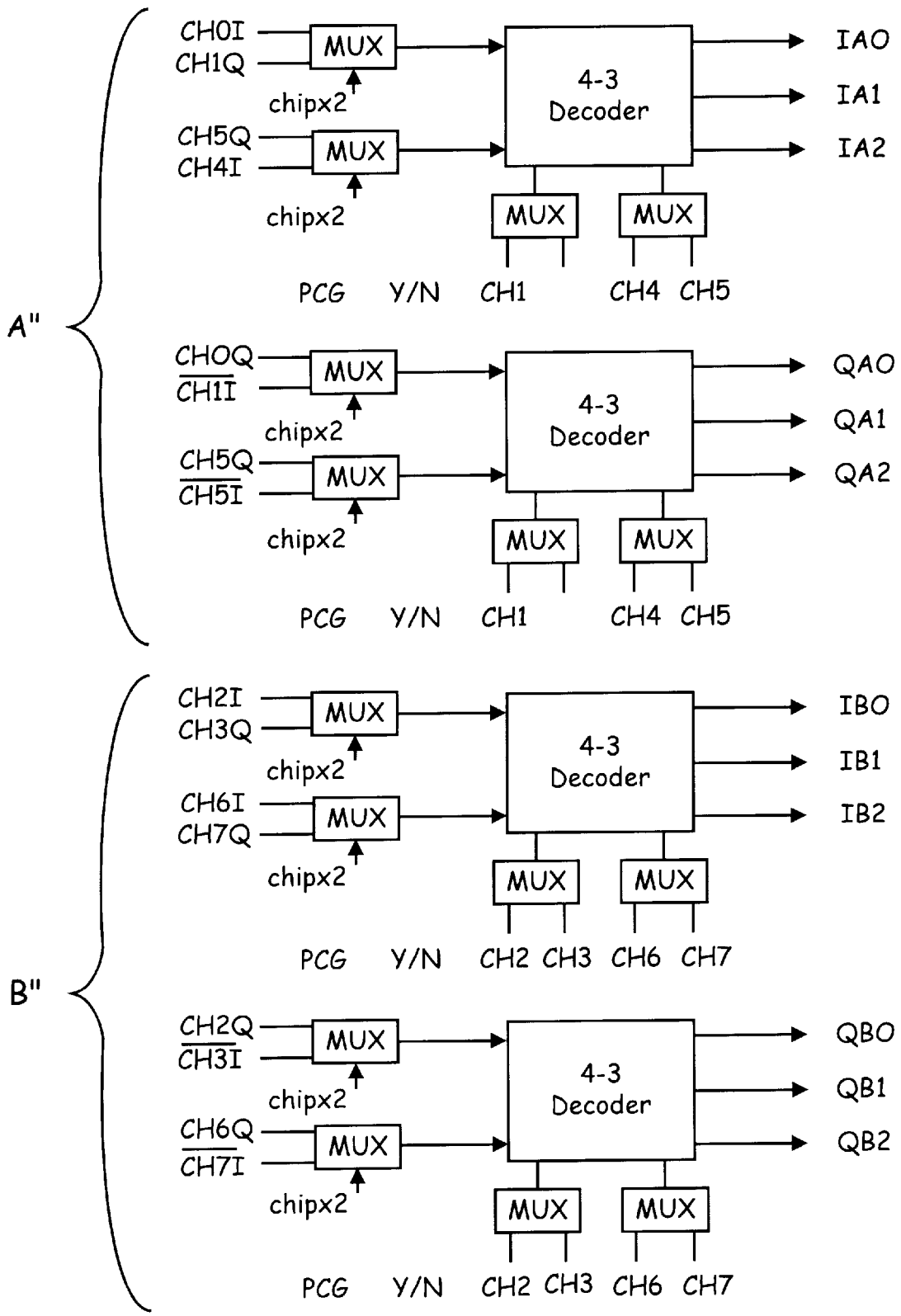
FIG. 9 is a schematic block diagram of the decoder/mixer blocks 41' to 44' of FIG. 8.

FIG. 8 shows that the four sets of input signals are provided to four decoder/mixing blocks 41' to 44' and suggests that the various inputs may be selectively turned "on" and "off." FIG. 9 shows the details of the four decoder/mixing blocks 41' to 44'. As shown in FIG. 9, the input signals are multiplexed at the chipX2 rate in the data mixing blocks. Note also that the input signals are binary signals clocked at the chip rate and signal Is for channels 1, 3, 5, and 7 are inverted before data mixing is taken. The decoder/mixing blocks 41' to 44' operates at the chipX2 rate and perform three functions. First, each block maps binary signals from the set of {0,1} into signals from the set of {1, −1} before the addition operation is performed. Second, each block takes full control of each channel's on/off operation such that one channel filter design is suitable for all of the various channel combinations. Third, each block performs active channel composition and generates the decoder output signal. The following truth table shows the relationship between the inputs and outputs of the decoder/mixing blocks:

TABLE 1

Truth table for the decoder

| Inputs | | | | Outputs | | |
|---|---|---|---|---|---|---|
| In1 | In0 | En1 | En0 | Out2 | Out1 | Out0 |
| x | x | 0 | 0 | 0 | 0 | 0 |
| 0 | x | 1 | 0 | 0 | 0 | 1 |
| 1 | x | 1 | 0 | 1 | 0 | 1 |
| x | 0 | 0 | 1 | 0 | 0 | 1 |
| x | 1 | 0 | 1 | 1 | 0 | 1 |
| 0 | 0 | 1 | 1 | 0 | 1 | 0 |
| 0 | 1 | 1 | 1 | 0 | 0 | 0 |
| 1 | 0 | 1 | 1 | 0 | 0 | 0 |
| 1 | 1 | 1 | 1 | 1 | 1 | 0 |

Note that the output is in sign magnitude format. Since the possible output values are {−2, −1, 0, 1, 2}, multiplication is still not required after this data mixing. We can enjoy the all the hardware saving benefits without increasing filter design complexity.

The operation of each 2:1 multi-rate FIR filter 60IQ for channels I and Q is similar to the ones for the single channel I and Q of FIG. 7. The only difference is the pipeline structure applied in this filter. There are two sets of shifting registers of length 24: one for the channel I and the other for the channel Q. The data input rates for both channel I and Q are chipX2. When two input samples, one from the channel I and the other from the channel Q, shift in, the filter firstly produces one output for the channel I resulting from the inner products between data from channel I registers and the even filter coefficients. Then it produces another sample for the channel Q with the same subset of the coefficients. After that, the filter produces two outputs alternatively for the channel I and channel Q by using odd coefficients.

In the "A" group, the filter 60IQ produces alternative outputs of composite signals on a channel $I_A'$ and a channel $Q_A'$. In the "B" group, the filter 70IQ produces alternative outputs of composite signals on a channel $I_B'$ and a channel $Q_B'$. A register 100' delays the output signal of the "A" group by one unit of chipx8 to compensate for the delay caused by the phase rotation process and thereby align the group "A" signal with the group "B" signal.

In the "B" group, post-filter phase rotation of 45 degrees is required as before and is accomplished in block 40'. The detailed operation can be illustrated as follows. The filter outputs can be represented as $I_{B0}$, $Q_{B0}$, $I_{B1}$, $Q_{B1}$, $I_{B2}$, $Q_{B2}$, . . . . If filter output is $Q_{B1}$, the inputs of the adder are $I_{B1}$ and $Q_{B1}$. Then output of the adder is $I_{B1}+Q_{B1}$ and the multiplex selects the upper branch and its output is $I_{B1}+Q_{B1}$. At the same time, the subtraction operation produces an output of $-I_{B1}+Q_{B1}$ as the input of shift register in the lower branch of the phase rotator. At the next clock cycle, the register output in the lower branch is $-I_{B1}+Q_{B1}$ and mutiplex selects the lower branch and produces an output of $-I_{B1}+Q_{B1}$. Similarly, the mutiplex output $I_{B2}+Q_{B2}$, $-I_{B2}+Q_{B2}$, and etc. The signals in the group A and B combines together to generate alternative final I and Q signals.

What is claimed is:

1. A wireless communication system for transmitting a plurality of digital baseband streams over a corresponding plurality of code-channels in a wireless channel which are to have predetermined phase offsets when modulated with a carrier, the code-channels being grouped into first and second "orthogonal" groups of code-channels wherein the individual code-channels in each group have a phase offset of 0° or 90° and wherein the first and second groups as a whole have a phase offset of $\Delta_{GROUP}°$, the system comprising:

means for converting each digital baseband stream into inphase and quadrature signals I, Q;

means for grouping a first plurality of the code channels into the first orthogonal group of code channels comprising a zero-degree channels which requires a total phase rotation of 0° and a ninety-degree channel which requires a total phase rotation of 90°;

means for grouping a second plurality of the code channels into the second orthogonal groups of code channels comprising a zero-plus-delta degree channel which requires a total phase rotation of $0°+\Delta_{GROUP}°$ and a ninety-plus-delta degree channel which requires a total phase rotation of $90°+\Delta_{GROUP}°$;

pre-filter means for phase-rotating the ninety-degree channels by 90°;

pre-filter means for combining the signals of the zero-degree channels with the signals of the ninety-degree channels to form combined signals;

first means for filtering the combined signals of the first group of channels to form a first group of filtered signals that are better suited for transmission over the wireless channel;

second means for filtering the combined signals of the first group of channels to form a second group of filtered signals that are better suited for transmission over the wireless channel;

post-filter means for phase-rotating the second group of filtered signals to a second group of phase-rotated, filtered and phase-rotated signals; and means for combining the first group of phase-rotated and filtered signals and the second group of phase-rotated, filtered, and phase-rotated signals to form final signals.

2. The wireless communication system of claim 1 wherein the plurality of code channels comprises eight code channels.

3. The wireless communication system of claim 2 wherein the eight code channels are divided into first and second groups and wherein $\Delta_{GROUP}°$ is 45°.

4. The wireless communication system of claim 1 wherein the plurality of code channels is divided into first and second groups and wherein $\Delta_{GROUP}°$ is 45°.

5. The wireless communication system of claim 1 wherein the plurality of code channels is divided into first, second and third groups.

6. The wireless communication system of claim 5 wherein $\Delta_{GROUP}°$ is 60°.

7. The wireless communication system of claim 1 wherein the first and second filtering means are implemented as pipelined filters.

8. A wireless communication system for transmitting eight digital baseband streams over eight code-channels in a wireless channel, the code-channels having predetermined phase offsets when modulated with a carrier, the code-channels being grouped into first and second groups of code-channels wherein the individual code-channels in each group have a phase offset of 0° or 90° and wherein the first and second groups as a whole have a phase offset of $\Delta_{GROUP}°$, the system comprising:

means for converting each digital baseband stream into inphase and quadrature signals I, Q;

means for grouping a first plurality of the code channels into a first orthogonal group of code channels comprising zero-degree channels which require a total phase rotation of 0° and ninety-degree channels which require a total phase rotation of 90°;

means for grouping a second plurality of the code channels into a second orthogonal groups of code channels comprising zero-plus-delta degree channels which require a total phase rotation of $0°+\Delta_{GROUP}°$ and ninety-plus-delta degree channels which require a total phase rotation of $90°+\Delta_{GROUP}°$;

first and second pre-filter means for phase-rotating the inphase and quadrature signals I, Q of the ninety-degree channels by 90° to form phase rotated signals $I_{90}$, $Q_{90}$ by setting $I_{90}=Q$ and $Q_{90}Q=-I$;

first and second pre-filter means for combining the signals I, Q of the zero-degree channels with the signals $I_{90}$, $Q_{90}$ of the ninety-degree channels to form combined signals $I_A$, $Q_A$ and $I_B$, $Q_B$, respectively;

first means for filtering the combined signals $I_A$, $Q_A$ to form filtered signals $I_A'$, $Q_A'$ that are better suited for transmission over the wireless channel;

second means for filtering the combined signals $I_B$, $Q_B$ to form filtered signals $I_B'$, $Q_B'$ that are better suited for transmission over the wireless channel, said second filtering means further comprising means for scaling the filtered signals $I_B'$, $Q_B'$ with phase-rotation coefficients $K_I$, $K_Q$ to produce scaled and filtered signals $K_I I_B'$, $K_Q Q_B'$;

post-filter means for phase-rotating the scaled and filtered signals $K_I I_B'$, $K_Q Q_B'$ by mathematically processing such signals to produce filtered and phase-rotated signals $I_B''$, $Q_B''$; and means for combining the phase-rotated and filtered signals $I_A'$, $Q_A'$ and the phase-rotated and filtered phase-rotated signals $I_B''$, $Q_B''$ to form final signals $I_{FINAL}$, $Q_{FINAL}$.

9. The wireless communication system of claim 8 wherein the first and second filtering means are implemented as pipelined filters.

10. A method of transmitting eight digital baseband streams over eight code-channels having predetermined phase offsets when modulated with a carrier, the method comprising the steps of:

grouping a first plurality of the code-channels into a first orthogonal group of code-channels comprising zero-degree channels which require a total phase rotation of 0° and ninety-degree channels which require a total phase rotation of 90°;

grouping a second plurality of the code channels into a second orthogonal groups of code channels comprising zero-plus-delta degree channels which require a total phase rotation of $0°+\Delta_{GROUP}°$ and ninety-plus-delta degree channels which require a total phase rotation of $90°+\Delta_{GROUP}°$;

converting each digital baseband stream into inphase and quadrature signals I, Q;

phase rotating the inphase and quadrature signals I, Q of the ninety-degree channels by 90° to form phase rotated signals $I_{90}$, $Q_{90}$ by setting $I_{90}=Q$ and $Q_{90}=-I$;

combining the signals I, Q of the zero-degree channels with the signals $I_{90}$, $Q_{90}$ of the ninety-degree channels to form combined signals $I_A$, $Q_A$;

phase rotating the inphase and quadrature signals I, Q of the ninety-plus-delta degree channels by 90° to form phase rotated signals $I_{90}$, $Q_{90}$ by setting $I_{90}=Q$ and $Q_{90}=-I$;

combining the signals I, Q of the zero-plus-delta degree channels with the signals $I_{90}$, $Q_{90}$ of the ninety-plus-delta degree channels to form combined signals $I_B$, $Q_B$;

filtering the combined signals $I_A$, $Q_A$ to form filtered signals $I_A'$, $Q_A'$ that are better suited for transmission over the wireless channel;

filtering the combined signals $I_B$, $Q_B$ to form filtered signals $I_B'$, $Q_B'$ that are better suited for transmission over the wireless channel;

scaling the filtered signals $I_B'$, $Q_B'$ with phase-rotation coefficients $K_I$, $K_Q$ to produce scaled and filtered signals $K_I I_B'$, $K_Q Q_B'$;

phase-rotating the scaled and filtered signals $K_I I_B'$, $K_Q Q_B'$ by mathematically processing such signals without multiplication to produce filtered and phase-rotated signals $I_B''$, $Q_B''$ that implement $\Delta_{GROUP}°$; and combining the phase-rotated and filtered signals $I_A'$, $Q_A'$ and the phase-rotated and filtered phase-rotated signals $I_B''$, $Q_B''$ to form final signals $I_{FINAL}$, $Q_{FINAL}$.

11. A method of transmitting a plurality of digital baseband streams over a plurality of code-channels that are each to have a predetermined phase relationship when modulated with a carrier, the method comprising the steps of:

phase rotating first and second subsets of the plurality of digital baseband streams;

separately filtering the first and second subsets of digital baseband streams;

phase rotating the second subset of digital baseband streams;

combining the first and second subsets of digital baseband streams to form a combined signal; and modulating a single carrier with the combined signal.

* * * * *